United States Patent [19]

Ziccarelli

[11] 4,086,367

[45] Apr. 25, 1978

[54] FRUIT FLAVORED COMPOSITION

[75] Inventor: Salvatore F. Ziccarelli, Downers Grove, Ill.

[73] Assignee: Beatrice Foods Co., Chicago, Ill.

[21] Appl. No.: 509,633

[22] Filed: Sep. 26, 1974

Related U.S. Application Data

[63] Continuation-in-part of Ser. No. 338,523, Mar. 6, 1973, Pat. No. 3,843,808.

[51] Int. Cl.² .......................... A23L 1/00; A23L 1/06; A23D 5/00; A23C 21/00
[52] U.S. Cl. ...................................... 426/98; 426/102; 426/454; 426/583; 426/650
[58] Field of Search .................. 426/98, 102, 146, 206, 426/89, 103, 516, 471, 221, 583, 454, 650

[56] References Cited

U.S. PATENT DOCUMENTS

| | | |
|---|---|---|
| 2,913,342 | 11/1959 | Cameron et al. ...................... 426/98 |
| 3,105,766 | 10/1963 | Barton .............................. 426/206 X |
| 3,796,814 | 3/1974 | Cermak ............................ 426/221 X |

*Primary Examiner*—David M. Naff
*Attorney, Agent, or Firm*—Murray and Whisenhunt

[57] ABSTRACT

A fruit-flavored, shelf-stable and self-preserving composition is prepared containing natural fruit-flavors or artificial fruit-flavors and finely dispersed fat particles having a melting temperature of 90° to 124° F enrobed in a fat enrobing agent that prevents coalescing of the fat particles by preventing fat-to-fat contact of the particles. The composition has a moisture content of no more than 5% and can be made to resemble bits of natural fruit meat. A preferred enrobing agent contains dried yeast and whey.

12 Claims, No Drawings

FRUIT FLAVORED COMPOSITION

This is a continuation-in-part of copending application Ser. No. 338,523, filed March 6, 1973, now U.S. Pat. No. 3,843,808, which disclosure is incorporated herein by reference.

The present invention relates to a fruit flavored composition and method of manufacture thereof, which composition resembles bits of natural fruit meat. More particularly, the invention relates to the aforenoted composition having the important properties of being shelf-stable and self-preserving.

Fruit bits are used in many food compositions and foods, including toppings, sauces, pastries, pancakes, cakes, pies, ice cream, cereal, etc. However, any food composition, which has natural fruit meat bits therein is not shelf-stable and must be packaged or otherwise stored in a preserving atmosphere, e.g., sterile packaging, frozen, etc. Otherwise, the fruit must be dried or candied, but this essentially destroys the desired fruit flavor and is not acceptable, except for traditionally dried fruit, e.g., raisins. Since many of the aforenoted food compositions are produced in the so-called "convenience food" packages, it would be, of course, most desirable to incorporate in these convenience food compositions a product which closely resembles natural fruit bits in appearance, flavor and mouth feel, but which does not require special packaging or storage conditions.

It is therefore an object of the present invention to provide fruit flavored compositions which closely resemble bits of natural fruit in appearance, taste and mouth feel, but which are shelf-stable at ambient conditions for long periods of time and which are self-preserving. It is a further object to provide a method of manufacture of such compositions as well as food products containing those compositions. Other objects will be apparent from the following disclosure and claims.

The present compositions are shelf-stable and self-preserving, fruit-flavored bits which have the appearance, taste, consistency and mouth feel of natural fruit meat bits and comprise fruit flavors (natural or imitation) and finely divided fat particles. The fat particles have a melting point not greater than 125° F, especially between 90° to 124° F, and are substantially coated with a fat enrobing agent. The composition must also have a moisture content of no more than 5% by weight.

The fruit flavors may be low moisture natural fruit juice essences or artificially produced fruit flavors or combinations thereof, so long as the flavors have a taste similar to natural fruit meat. Thus, for purposes of the present specification, the term "fruit flavors" is intended to embrace artificial fruit flavors as well as natural fruit flavors.

In one method of producing the composition, the moisture content of the fruit flavors is low enough to produce an ultimate composition having a maximum moisture content of 5% by weight or less. Alternately, since other ingredients of the present composition often have very low moisture contents, the fruit flavors may have moisture contents above 5%, and the combined ingredients produce a composition having a total moisture content of 5% by weight or less. Further, the moisture content of the ingredients can be as desired and the composition is finally dried to the required low moisture content.

As noted above, in lieu of natural fruit flavors, artificial fruit flavors may be used in the present composition. These artificial fruit flavors may be any of the conventionally used fruit flavors, including imitation cherry, orange, lemon, lime, blueberry, raspberry, banana, grape, apple, strawberry, etc. These imitation fruit flavors may be disposed on a carrier or diluent of food grade materials, e.g., sugars (sucrose, dextrose, fructore), starches (wheat or corn starches) and gums (gum arabic, gum tragacanth, etc.). Many such imitation flavors are well known to the art and need not be detailed herein.

The properties of the particular fat used in the present composition are quite critical to the success of the invention. The final composition, of course, must be a solid at room temperature (i.e., not a flowable liquid) but yet must be essentially chewable to liquefy in the mouth, in the manner of natural fruit bits, in order to provide the correct mouth feel. In natural fruit bits, this chewable property is provided, at least in part, by the relatively high moisture content of the natural fruit bits. However, this moisture content makes the fruit bits not self-preserving. In the present composition, the moisture has been replaced by the fat and, therefore, the fat must have properties which, in the composition, will mimic the moisture content of fruit bits. On the other hand, the composition must not have a waxy mouth feel, which can result from waxy fats, i.e., fats of too high melting points and like properties.

For the above reasons, the fat must have a melting point (Wiley) of no lower than 90° and no higher than 124° F. Preferably, however, the melting point will be between about 95° and 120° F, especially between about 97° and 110° F. A preferred melting point is between 97° and 101° F. Additionally, the fat should have a Solid Fat Index (S.F.I.) within the following ranges:

| Fat Composition | SOLID FAT INDEX Index Temp. Range F | Unmelted Weight % |
|---|---|---|
| A | 50° F | 72 |
|   | 70 F | 63 |
|   | 80 F | 55 |
|   | 92 F | 25 |
|   | 100 F | 5 (max.) |
| B | 50 F | 70 |
|   | 50 F | 70 |
|   | 70 F | 64 |
|   | 80 F | 50 |
|   | 92 F | 3.5 |
|   | 110 F | 0 |
| C | 50 F | 68 |
|   | 70 F | 58 |
|   | 80 F | 52 |
|   | 92 F | 30 |
|   | 100 F | 19 |
|   | 110 F | 12 |

The S.F.I. of the fat is preferably at least as high as that of composition A, although a S.F.I. as low as that of composition B is permissible. Composition C is the highest permissible S.F.I. Far preferable, however, the S.F.I. of the fat used is between composition B and composition C and more nearly that of composition A. The Solid Fat Index is a standard fat test which is carried out by use of a conventional dilatometer.

It should be appreciated from the above that the particular fat need not be a pure fat, and indeed the fat is often a mixture of specific fats. By mixing various specific fats, a melting point and S.F.I. within the above ranges can easily be prepared from commercially available fats. The particular fats are not critical and can be derived from vegetables, such as corn oil, soybean oil, safflower oil and the like, suitably hydrogenated to provide the foregoing properties, and animal fats such as marine fats, rendered animal fat and the like.

It is necessary that the fat be dispersed in the present composition as finely divided particles. However, if the finely divided particles are subsequently allowed to contact, they will slowly coalesce. While this could be accomplished by good initial mixing which fully separates the fat particles, subsequent handling and use of the composition can easily cause contact of the fat particles and subsequent coalescing thereof. Accordingly, the fat particles should be coated so that even when the particles contact each other, it is a coating-to-coating contact and not a fat-to-fat contact. Any edible material which will coat fat particles and prevent low melting components of the fat from bleeding therethrough may be used, and many such materials are known in the art, e.g., as fat enrobing agents. The enrobing agent, however, must be capable of substantially fully enrobing the fat particles and preventing substantial bleeding of the fat through the enrobing agent. Thus, the enrobing agent can be any of the conventional food grade fat enrobing agents such as vegetable gums, cereals, starches and flours, dextrin, non-fat milk solids and proteins. For example, gum arabic, carboxymethyl cellulose, sodium caseinate, corn starch, microcrystalline cellulose, soybean protein, gelatin and the like may be used.

However, superior results are obtained when a particular fat enrobing agent is used, and this is the preferred form of the invention. This particular enrobing agent is disclosed in copending application Ser. No. 277,048, filed Aug. 1, 1972, the entire disclosure of the said application being incorporated herein by reference and the entire disclosure being relied upon. The product disclosed in that said application is defined as a flavor potentiator, but it has now been found that the product also functions as a superior fat enrobing agent in the present composition, as well as a flavor potentiator. The product of that application is produced by heating a mixture of yeast and whey, while in the fluid state, to a temperature at least 140° F and the mixture is allowed to dwell at that temperature. The fluid mixture is then dried, e.g., spray dried. The ratio, on a dry basis of yeast to whey is less than 75:25, preferably less than 50:50 and more preferably less than 25:75. The ratio, however, is at least 2:98. The product can be described as a dry, heat-treated synergistic combination of yeast and whey. Thus, for purposes of the present specification, the terms "dried yeast and whey" are defined to reference the foregoing described product of the said application. This product is commercially available under the trademark FP-37, manufactured by the Beatrice Foods Company.

The proportion of the ingredients can vary widely depending upon the precise consistency, taste and mouth feel desired. Thus, on a weight basis, the fat can be between about 30 to 50%, especially 35 to 45%. The fruit flavors, on a solids weight basis, can be from as little as 0.001% for concentrated imitation flavors to 70% for all natural undried fruit flavors. Where all natural fruit flavors are used, at least 10% will be required. Where all imitation fruit flavors are used, conventional flavorings will require about 0.1% for best flavoring, e.g., 0.5% and up to as high as about 10%, although more usually about 2% or less. This will depend on the amount of imitation flavor required to give a flavor intensity equal to a natural flavor. Thus, for simplicity in the specification and claims, amounts of imitation flavors are based on weight percents as if they were diluented with an inert carrier, such as water or alcohol, to be equivalent in intensity to the natural flavor. On this basis (as is used in the claims) the amount of either natural or imitation flavor will be between about 10 to 70%, especially 40 to 60% on a weight basis. The fat enrobing agent can be from 1 to 20%, especially up to 10%.

The composition may be prepared by mixing the dry ingredients and then shaping the composition, e.g., by extrusion. The mixing and/or shaping step should disperse the fat in the fat enrobing agent so that fine particles of fat are substantially completely enrobed. The size of the fat particles is not narrowly critical, but it is preferred that the particles be less than 0.5 millimeter, especially less than about 0.1 millimeter and preferably less than 0.05 millimeter. Mixing can be at any desired temperature consistent with accomplishing dispersement of the fat, as described, but a temperature at about room temperature is preferred. Lower temperatures can be used but the lower temperatures are not required to produce the necessary sizes of fat particles. Thus, the temperature of the mixing may be between 34° and 85° F, especially between 65° and 80° F can be used, but temperatures between 70° and 75° F are preferred.

After the composition is mixed, it can be formed into desired compressed, molded or extruded shapes by conventional techniques. Additionally, the composition can be rolled into a thin sheet and then flakes by vibrators, brushes, revolving blades and the like into a bit very much resembling crushed or sliced natural fruit meat bits. In this latter method, however, it is preferred that the sheet be made on a nonstick surface such as a lightly greased metal support or a Teflon-coated metal support, preferably the support being cooled. Additionally, the compacted and sheet-formed composition can be cooled to form the bits. Alternately, the composition may be shaped by extruding in a conventional pellet mill, or like device, to produce a desired shape, such as rods, which are then chopped, preferably in irregular lengths, to provide shaped sections resembling natural fruit meat bits. The forming temperatures can be the same as the mixing temperatures, noted above, but it is preferred that the higher part of that range be used, e.g., between 70° and 85° F, especially between 75° and 80° F.

Alternately, the composition may be prepared by mixing the ingredients in a suitable diluent and then spray drying the mixture to provide finely-divided spray dried particles. The relative proportions of flavors, fat and enrobing agent can be as described above, although for spray drying it is preferred that the solids be contained in a diluent so that there are no more than about 50% by weight of solids in the mixture to be spray dried, e.g., the mixture is between about 3 and 50% by weight of total solids. Suitably, the diluent is simply water, preferably de-ionized water. The spray drying can be performed in conventional apparatus, such as conventional tower spray dryers or box spray dryers. Similarly, conventional spray drying temperatures may be used. For example, the flush gas (preferably air) entering temperature may be from about 290° to 325° F and the outlet flush gas temperature may be from about 150° to 190° F. The nozzle size for the spray drying is not at all critical, but the nozzle should produce spray dried particles within the size ranges noted above (or the particle size can be obtained by the spinning plate technique, if desired). The mixture to be spray dried may be heated, although this is not required. When the mixture is heated, however, it is preferred to keep the temperature less than about 190° F, e.g., less than about 170° F and preferably about 155° to 165° F. Heating of the mixture is a convenient way of intimately dispersing the fat in the mixture to be spray dried, i.e., a solution and/or suspension of ingredients, in order to insure uniform distribution of the fat. When heating is used for this purpose, the temperature of mixture (the solution/suspension) of the ingredients should be above at least about 100° F and preferably above about 110° F. A suitable temperature is 120° F, especially when the mixture to be spray dried is homogenized prior to spray drying. In this latter regard, whether the mixture to be spray dried is heated or not, it is preferred to homogenize the mixture by passing the mixture through a conventional homogenizing apparatus, such as a Manton-Gaulin Homogenizer. Homogenization pressures of from 500-2,000 p.s.i. are suitable, especially around 1,500 p.s.i. Of course, the spray drying should reduce the moisture content to within the ranges noted above.

For convenience, it is preferred that the solution/suspension (mixture) of ingredients to be spray dried also incorporate conventional spray drying aids. These aids are used for their conventional purposes, e.g., viscosity control, surface tension control, burn avoidance, etc. Thus, the conventional spray drying aids such as dextrin, gelatin, caseinates (sodium, potassium and calcium caseinates) whey solids (sweet whey & acid whey) and gums (such as gum arabic, gum tragacanth, etc.) may be used.

In the preferred method of spray drying the composition, the water dissolvable ingredients of the composition are first dissolved in heated water. Thus, for example, the sweeteners (sucrose), drying aids, enrobing agents, flavorings and the like which are water soluble may be first dissolved in heated water, e.g., between 100°-210° F and preferably at least to pasteurization, e.g., 160° F for 30 minutes. The pasteurized mixture is then cooled, e.g., to about 120° F, and the fat is placed therein. Of course any other ingredients which are not water soluble could be placed into the heated water either prior to or after pasteurization, but if practical, it is, of course, preferred to include those ingredients prior to pasteurization. After the fat has melted, the mixture is then homogenized, as noted above, and then spray dried. Where the spray drying nozzle effects considerable back pressure, this will further provide some homogenization. Thus, for example, if a conventional 72/20 nozzle is operated at 1,500 p.s.i., then additional homogenization just prior to spray drying is accomplished.

The spray dried powder can be reconstituted into the form of a fruit bit, simply by extruding in a conventional food extruder or pellet mill or by any means which will compress the spray dried particles into close association and therefore cause coalescence and adherence of the particles, e.g., nip rolls, belt presses, molds, etc. No particular criticality is involved in this compression (consolidation) of the powder to form the bits other than that excessive pressure should not be used, i.e., that amount of pressure which will destroy the enrobing of the fat particles and cause excessive oiling of the particles. Generally speaking, pressures substantially above pellet mill pressures should be avoided, for example, pressures greater than about 100 p.s.i.

The composition, as is conventional in the art, may include coloring agents, such as FD & C yellow No. 5, and preservatives, such as BHT, propyl galate, BHA and mixtures thereof. Further, sugars may be added to provide desired sweetness, e.g., sucrose, dextrose, maltose, fructose, etc. Usually the sugar will constitute between 5 and 50% by weight of the ingredients on a dry basis, e.g., especially between 10 and 30%, i.e., about 15-25%. Thickeners and flow control agents may also be used, e.g., dextrin, gelatin, gums (natural and synthetic) and calcium stearate.

The composition of the present invention may be added to cakes, pies, cereals, pancakes, ice cream, toppings, cookies, sauces, and the like. The composition has a special advantage in that it may be added to a dry composition and will remain shelf-stable and self-preserving for extended lengths of time. Accordingly, the dry ingredients of a pancake mix can be packaged in a conventional foil or plastic pouch, including, for example, blueberry bits according to the present invention, and the contents of that package will be shelf-stable. The product, indeed, can be used in any way that natural fruit meat bits are used, but additionally has the advantage of use where the product must be shelf-stable and self-preserving, e.g., at least up to 1 month and generally longer than 6 months or even a year or 2 years or more, depending on the particular composition. Of course, the proportion of the present product with other ingredients of the food composition will be according to taste.

The invention will be illustrated by way of the following examples, but it is to be understood that the invention is not limited thereto but is fully applicable to the extent of the foregoing disclosure. In the examples, as elsewhere in this specification, all percentages are by weight unless otherwise indicated.

EXAMPLE 1

4 parts of imitation bluberry flavor, 18 parts of sugar, 2 parts of dry yeast and whey (trademark FP-37 manufactured by Beatrice Foods Co. and used as the enrobing agent), 2 parts of malic acid, 2 parts of 75° bloom gelatin, 0.04 part of FD & C Red color No. 40, 0.02 part of FD & C Blue color No. 1, 14 parts of dextrin and 50 parts of 97° to 101° F melt fat were added to a blender and thoroughly mixed at room temperature. The mixture was then placed in a pellet mill and pelletized at a temperature of about 75° to 85° F, which temperature was generated in the composition by the mechanical energy of mixing and extruding. The extruded rods were cut to irregular lengths having a major width of about ⅛ inch and a maximum length of about ¼ inch, although the length was random.

A portion of the product was set aside for shelf-stability tests at ambient conditions and after seven nonths no deterioration of the product was evident. Another portion of the product was stored at a temperature of 110° F for 10 days in an accelerated shelf-life test and no substantial deterioration of the product was observed. The product was then placed in a water-tight container and partially immersed in a water bath maintained at 140° F for a severe accelerated test. The product remained essentially solid for 8 hours. Another portion of the product was placed in the refrigerator and allowed to come to a temperature of approximately 45° F. The product was still most palatable and not unlike refrigerated natural fruit bits. Another portion of the product was placed in commercially available pancake mix and pancakes were prepared therefrom. The fruit-flavored bits remained essentially intact during the cooking of the pancakes and the pancakes had the taste and appearance of pancakes with natural blueberry meat bits therein.

EXAMPLE 2

The procedure was repeated, except that imitation blackberry flavor replaced the imitation blueberry flavor and the resulting pancakes had the taste and appearance of blackberry bits in pancakes.

EXAMPLE 3

This example will illustrate the use of dry fruit-flavored solids derived from natural fruit flavors. 45 Parts of dry raspberry powder (Beatrene 3114, manufactured by the Beatrice Foods Co., which is spray dried raspberry juice and essences on dextrin or gum arabic carrier), 35 parts 97° F to 101° F melt fat, 19 parts of wheat flour (as enrobing agent) and 1 part natural flavors were blended and shaped in the same manner as Example 1. The fruit bit produced had the appearance, taste, consistency and mouth feel of dried fruit bits. The fruit bits were mixed with a conventionally prepared pancake mix to produce raspberry pancakes.

EXAMPLE 4

Eighteen parts of sugar, 17.5 parts of dextrin, 2 parts of 75 bloom gelatin, 2 parts of malic acid, 2 parts of dry yeast and whey (trademark FP-37 manufactured by Beatrice Foods Co.), 0.04 parts of FC&C red color No. 40, 0.02 parts FC&C blue No. 1, 2 parts of sodium caseinate, and 6 parts of dry whey solids (Puritein 25) were added to water and heated to 160° F with stirring. The mixture was held at that temperature for 30 minutes to cause pasteurization. Thereafter the mixture was cooled to 120° F and to the mixture was added 50 parts of melted fat (97°–101° F melt fat) and 0.5 parts of imitation blueberry flavoring (Felton imitation blueberry No. 123). The mixture was then homogenized in a Manton-Gaulin Homogenizer at 1,500 p.s.i. and spray dried with a conventional 72/20 nozzle at 1,500 p.s.i. The mixture was about 40% by weight of solids. The flush inlet gas (air) ranged in temperatures between 295° and 310° F and the outlet flush gas ranged in temperatures between 160° and 180° F. The product was a dry powder with particle sizes averaging less than about 0.5 mm. Most of the particle sizes were less than about 0.1 mm and generally around 0.05 mm.

The dried powder was placed in a pellet mill and processed in the same manner as in Example 1 and the products were essentially the same as the products of that Example. It will be appreciated, however, that since the spray drying process did cause pasteurization, significantly longer periods of freedom from substantial bacterial growth can be expected.

EXAMPLE 5

The procedure of Example 4 was repeated except that the followng composition was as follows:

9 Parts of apple juice concentrate, 3 parts of true fruit apple, 0.21 parts of apple essence (the foregoing are conventional flavorings), 24.34 parts of dextrin, 15 parts sugar, 40 parts of 97° to 101° melt fat, 2 parts of dried yeast and whey (trademark FP-37 manufactured by Beatrice Foods Co.), 0.1 parts of imitation cinnamon flavor, 0.35 parts of imitation apple flavor, 3 parts of sodium citrate, and 2 parts of 75 bloom gelatin. In this procedure the dextrin, sugar, sodium caseinate, sodium citrate and gelatin were dissolved in the water and heated to 160° F. While a mixture was maintained at this temperature, the apple juice concentrate, true fruit apple and fat were added. The mixture was then cooled after 30 minutes at 160° to 120° F and then the apple essence, imitation cinnamon flavor and imitation apple flavor were added. Thereafter the procedure was the same as in Example 4. The total amount of solids dispersed in the water for spray drying was about 40% by weight. The product which resulted was very similar to the product of Example 4 and was extruded to pellet form in the same manner.

From the above disclosure, those skilled in the art will appreciate that many modifications of the invention are quite apparent. Thus, these modifications are intended to be embraced within the spirit and scope of the foregoing disclosure and the invention extend to the breadth of the annexed claims.

What is claimed is:

1. A fruit-flavored, shelf-stable and self-preserving composition comprising 10 to 70% fruit flavors and 30 to 50% finely divided fat particles having an average particle size not greater than 0.5 millimeter, said fat having a melting point in the range of from 90° to 125° F and said fat particles being substantially coated with a fat enrobing agent wherein at least a part of the fat enrobing agent is dried yeast and whey and wherein the enrobing agent which prevents coalescing of the fat particles by preventing fat-to-fat contact of the fat particles constitutes from 1.0% to 20% of the composition and said composition has a moisture content of no more than 5% by weight.

2. The composition of claim 1 wherein the enrobing agent is codried yeast and whey wherein the ratio of yeast to whey is from 75:25 to 2:98.

3. The composition of claim 1 wherein the fruit flavors are at least in part natural fruit flavors and in part imitation fruit flavors.

4. The composition of claim 1 wherein the enrobing agent is essentially only the dried yeast and whey.

5. The composition of claim 1 wherein the fruit flavors are totally imitation fruit flavors.

6. The composition of claim 1 wherein the melting point of the fat is at least 95° F.

7. The composition of claim 6 wherein the melting point of the fat is no greater than 120° F.

8. The composition of claim 7 wherein the melting point of the fat is between 97° and 101° F.

9. The composition of claim 1 admixed with a food product.

10. The composition of claim 1 in a spray-dried powdered or compressed spray-dried powdered form.

11. The composition of claim 10 in a compressed spray-dried powdered form.

12. The composition of claim 10 in a spray-dried powdered form.

* * * * *